(12) United States Patent
Tsikata

(10) Patent No.: US 11,751,544 B2
(45) Date of Patent: Sep. 12, 2023

(54) CAVITATION BARRIER FOR AQUATIC SPECIES

(71) Applicant: Edem Tsikata, Cambridge, MA (US)

(72) Inventor: Edem Tsikata, Cambridge, MA (US)

( * ) Notice: Subject to any disclaimer, the term of this patent is extended or adjusted under 35 U.S.C. 154(b) by 754 days.

(21) Appl. No.: 16/669,607

(22) Filed: Oct. 31, 2019

(65) Prior Publication Data
US 2020/0137990 A1     May 7, 2020

Related U.S. Application Data

(60) Provisional application No. 62/754,264, filed on Nov. 1, 2018.

(51) Int. Cl.
*A01K 61/95* (2017.01)
*F15D 1/00* (2006.01)
*A01M 29/30* (2011.01)

(52) U.S. Cl.
CPC .............. *A01K 61/95* (2017.01); *A01M 29/30* (2013.01); *F15D 1/00* (2013.01)

(58) Field of Classification Search
CPC ....... A01K 61/95; A01K 61/90; A01M 29/06; A01M 29/24; A01M 29/30; A01M 29/00; A01M 29/16; A01M 29/18; A01M 29/22; F15D 1/00
See application file for complete search history.

(56) References Cited

U.S. PATENT DOCUMENTS

| | | | | |
|---|---|---|---|---|
| 2,690,158 A * | 9/1954 | Petty | ........................ | B07C 5/065 119/216 |
| 4,076,617 A * | 2/1978 | Bybel | ........................ | C02F 1/36 261/81 |
| 6,230,654 B1 * | 5/2001 | McNeil | ..................... | B32B 5/24 119/256 |
| 6,880,485 B2 * | 4/2005 | Massey | .................. | A01K 61/90 119/216 |
| 2001/0040062 A1 * | 11/2001 | Illingworth | ............. | B64C 27/20 416/185 |
| 2003/0031558 A1 * | 2/2003 | Illingworth | ............... | F15D 1/00 415/198.1 |

(Continued)

FOREIGN PATENT DOCUMENTS

| | | | | |
|---|---|---|---|---|
| CN | | 206576144 U | * 10/2017 | |
| WO | | WO-0133084 A1 | * 5/2001 | ........... B64C 11/001 |
| WO | | WO-2017168294 A1 | * 10/2017 | ............ A01M 29/30 |

OTHER PUBLICATIONS

Results from STIC search (Year: 2022).*

(Continued)

*Primary Examiner* — Tien Q Dinh
*Assistant Examiner* — Katelyn T Truong
(74) *Attorney, Agent, or Firm* — Morgan, Lewis & Bockius LLP

(57) ABSTRACT

Embodiments of the present invention provide a novel deterrent barrier based on the phenomenon of fluid cavitation. A drive unit comprising a motor and a propeller are configured for inducing cavitation in water. The cavitation takes the form of a rotationally confined vertical column of cavitation bubbles extending from the propeller, and a one-dimensional series of drive units spanning the width of a waterway may provide an effective, environmentally friendly and non-lethal barrier against entry of target fish species.

9 Claims, 4 Drawing Sheets

(56) References Cited

U.S. PATENT DOCUMENTS

| | | | | |
|---|---|---|---|---|
| 2004/0244712 | A1* | 12/2004 | Massey | A01K 61/90 |
| | | | | 119/216 |
| 2013/0139761 | A1* | 6/2013 | Nedwell | E02B 1/006 |
| | | | | 119/219 |
| 2013/0249218 | A1* | 9/2013 | Vassilev | F03D 80/10 |
| | | | | 290/55 |
| 2016/0000051 | A1* | 1/2016 | Goodrick | A01K 61/90 |
| | | | | 119/844 |
| 2016/0017558 | A1* | 1/2016 | French, Sr. | G01N 27/028 |
| | | | | 405/81 |
| 2019/0264406 | A1* | 8/2019 | Furusawa | E02B 1/006 |
| 2021/0142052 | A1* | 5/2021 | James | G06F 18/22 |

OTHER PUBLICATIONS

Volker Bertram, Practical Ship Hydrodynamics (Second Edition), 2012, ScienceDirect, p. 5/11 of the ScienceDirect Website. https://www.sciencedirect.com/topics/engineering/cavitating-propeller (Year: 2012).*

* cited by examiner

CAVITATION BARRIER FOR AQUATIC SPECIES

RELATED APPLICATION

This application claims priority to, and the benefits of, U.S. Provisional Application Ser. No. 62/754,264, filed on Nov. 1, 2018, the entire disclosure of which is hereby incorporated by reference.

BACKGROUND

In the United States, asian carp refers to grass, silver, bighead, and black carp species. These fish originated in eastern Asia. Grass carp were introduced into United States waters to help control weeds in aquaculture operations. Silver and bighead carp, which feed on plankton, and black carp, which are molluscivores, were undesirable tag-alongs. These voracious fish soon spread and have been crowding out native fish populations. Increasing carp populations are also altering ecosystems and killing off sensitive species such as freshwater mussels. Fishermen using young carp as live bait have further increased the spread of Asian carp, as have boats traversing locks up and down the Mississippi River.

Asian carp are hardy, lay hundreds of thousands of eggs at a time, and spread into new habitats quickly and easily. They can jump over barriers such as low dams. Conventional exclusion structures, such as underwater fences (including an elaborate electric fence) not only have failed to prevent further spread of the carp population, but are unwieldy, expensive, and potentially harmful to other species, navigation, and the natural aquatic environment.

SUMMARY

Embodiments of the present invention provide a novel deterrent barrier based on the phenomenon of fluid cavitation. The cavitation barrier offers a sustainable, long-term approach to exclusion of carp and other aquatic species (including aquatic mammals) from waterways. The cavitation barrier poses no threat to humans, wildlife, navigation, or infrastructure. The cavitation zone is tightly confined, and humans and animals can readily detect and avoid it. Ships may pass through the barrier without impairing its ability to deter fish. Cavitation bubbles do not change water chemistry and will not increase corrosion of metal structures like gates and dams.

Accordingly, in a first aspect, the invention relates to a deterrent barrier system for aquatic species. In various embodiments, the system comprises a mounting plate configured for affixation to a submerged feature of a waterway; on the mounting plate, at least drive unit comprising a motor and a propeller configured for inducing cavitation in water, the cavitation taking the form of a rotationally confined vertical column of cavitation bubbles extending from the propeller; and a protective grid substantially enclosing the propeller. The cavitation bubbles may take the form of vertical streams.

In some embodiments, the system comprises a plurality of drive units arranged transversely across the width of the waterway to generate a series of vertical columns of cavitation bubbles collectively forming a waterway-spanning curtain. The system may include a controller for operating the drive units so as to create regions in the curtain having weaker cavitation strength to permit traversal of the curtain by non-target aquatic species. The controller may be configured to operate the drive units in a pulsed fashion. In various embodiments, each of the drive units includes a plurality of motors (e.g., two) configured for rotating a single propeller.

In another aspect, the invention pertains to a method of selectively deterring migration of a target aquatic species along a waterway. In various embodiments, the method comprises the steps of providing a cavitation-producing drive unit; and operating the drive unit to induce cavitation in water, the cavitation taking the form of a rotationally confined vertical column of cavitation bubbles extending from the drive unit, the cavitation bubbles repelling the target aquatic species.

A plurality of drive units may be arranged transversely across the width of the waterway to generate a series of vertical columns of cavitation bubbles collectively forming a waterway-spanning curtain. The cavitation bubbles take the form of vertical streams, and the drive units may be driven so as to create regions in the curtain having weaker cavitation strength to permit traversal of the curtain by non-target aquatic species.

In some embodiments, the drive units are operated in a pulsed fashion. The method may, in some cases, further comprise the steps of computationally detecting the target aquatic species upstream from the drive unit; and in response, sending an activation signal to the drive unit, the drive unit remaining inactive until receipt of the activation signal.

The method may, in some instances, further include computationally detecting other aquatic species upstream from the drive unit, and in response, sending an activation signal to the drive unit to operate in a pulsed mode. In some embodiments, the method further includes the steps of providing a plurality of additional cavitation-producing units, the cavitation-producing units being arranged transverse to the waterway; computationally detecting other aquatic species upstream from the drive units; and in response, sending an activation signal to the drive units to create a semi-continuous barrier allowing passage of non-target aquatic species.

The drive unit may include a motor and a propeller, a high-pressure jet, a piezoelectric transducer, an optical source, and/or a source of focused ultrasound.

The term "substantially" or "approximately" means ±10% (e.g., by weight or by volume), and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The term "consists essentially of" means excluding other materials that contribute to function, unless otherwise defined herein. Nonetheless, such other materials may be present, collectively or individually, in trace amounts. The headings provided herein are for convenience only and are not intended to limit or interpret the scope or meaning of the claimed technology.

BRIEF DESCRIPTION OF THE DRAWINGS

The foregoing will be more readily understood from the following detailed description of the invention, in particular, when taken in conjunction with the drawings, in which.

DETAILED DESCRIPTION

Figure 1:
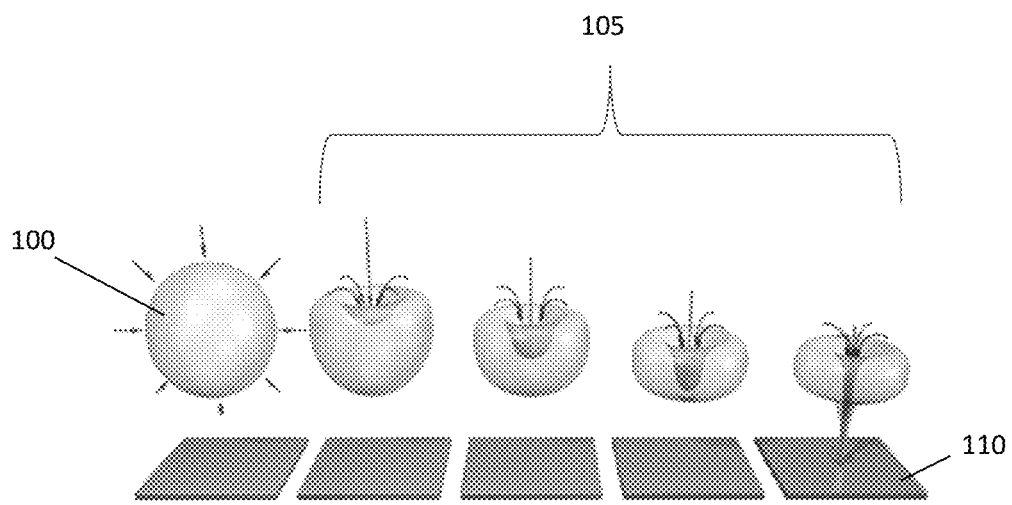
FIG. 1 schematically illustrates the phenomenon of cavitation.

Cavitation is the formation of voids in a liquid when pressure rapidly changes within it. The fluid spontaneously "boils" in regions of reduced pressure, creating bubbles that implode when they travel to regions of higher pressure. Bubble collapse can be highly energetic, generating temperatures as high as 19,700° C., acoustic shockwaves, and liquid jets that can erode metal. FIG. 1 illustrates successive stages in the collapse of a cavitation bubble. Cavitation may occur due to mechanical acceleration of the liquid or its passage through a restriction. When fluid is accelerated, the local pressure decreases in accordance with Bernoulli's Principle, and a vapor bubble 100 may form when the local pressure falls below the liquid's vapor pressure. When the velocity of the liquid decreases downstream of the disturbance or restriction, the pressure recovers, causing the bubble 100 to implode in a sequence of stages 105 that collectively represent the cavitation phenomenon. The collapsing bubble draws a jet of liquid at supersonic speed, and in the final stage that jet is ejected from the bubble at high speed, potentially causing ablation of nearby surfaces.

Figure 2:
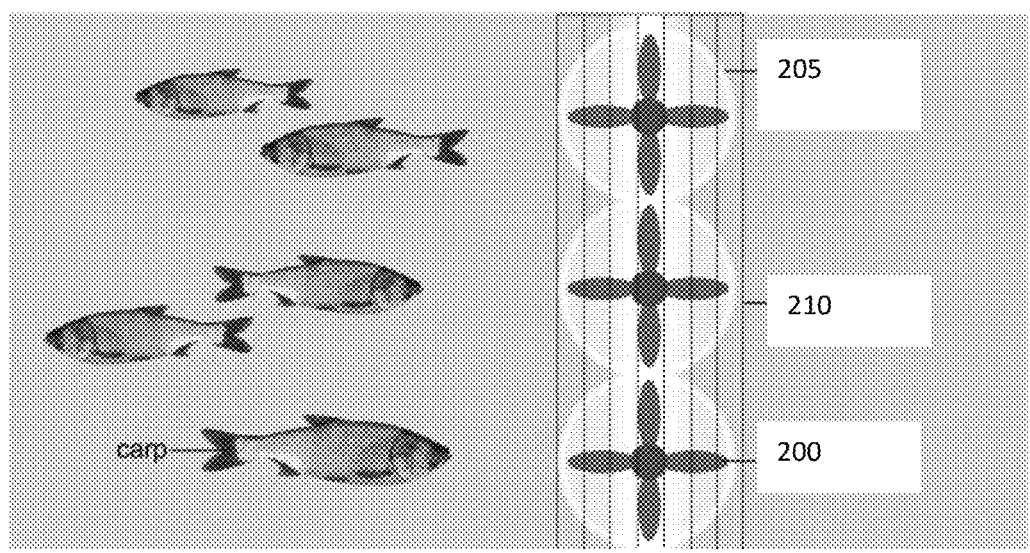
FIG. 2 is a schematic plan view illustrating the basic operation of an embodiment of the invention.

With reference to FIG. 2, an embodiment of the invention includes a plurality of high-speed propellers 200 to create rotationally confined columns 205 of cavitation bubbles spanning a waterway. These columns may be vertical, horizontal, or inclined at an angle. Each propeller 200 sweeps out a region of, for example, 1 m in diameter and generates thrust to project bubbles upward. A row of propellers 200 forms a wall of bubbles, desirably across the entire transverse width of the waterway, and the propellers may be screened by a barrier 210—for example, a metal, polymer or composite screen, cage or grid—to prevent injury to fish. The density of the bubble curtain at a 1 m cavitation zone width ensures that fish as small as two inches will interact with the bubble field. Accordingly, the approach of the invention is to create a non-physical barrier that avoids expensive, intrusive structures that can interfere with navigation and the local ecology while effectively excluding species such as asian carp.

In particular, deterrence of carp is achieved in multiple ways. Implosion of the bubbles on the skin of the fish causes non-lethal discomfort. The complex acoustic signals that accompany cavitation provide an additional negative stimulus. Within each cavitation zone 205, the presence of bubbles reduces the buoyancy and swimming ability of fish, restricting their passage. Moreover, the bubble-filled region collectively formed by the columns 205 concentrates sound, because it has a different density than the surrounding water. The barrier 205 introduces no toxic chemicals into the water and does not alter the water chemistry. The bubbles are true voids, containing water vapor at extremely low pressure. Because they are created from the water itself, they are chemically inert (unlike $CO_2$ bubbles, for example) and confined to a discrete region.

The cavitation bubbles form continuous streams accelerated upwards by the propellers 200 and their own buoyancy. To the unaided eye (human or fish), the helical streams are not visible; the bubbles have the appearance of a continuous cylindrical sheet. The spiral motion imparted by the propellers 200 ensures that the bubble columns 205 retain their vertical alignment substantially all the way to the surface. The columns 205 may appear as a wall of silver pillars. It is also important to note that the effects of bubble collapse (free jets and shockwaves) are felt at a finite distance from the columns 205. Water is incompressible, and shock waves from bubble implosion will cause discomfort even if a fish does not directly touch the bubbles. The long range of the sound and the propagation of the shock fronts will repel small and large fish.

Figure 3:
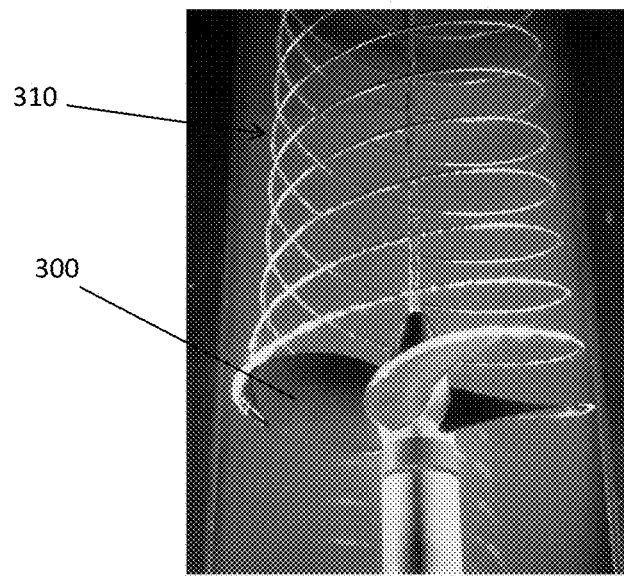
FIG. 3 is a perspective view of a representative propeller useful in connection with various embodiments and the propeller's operation.

The propeller blades are designed to produce stable columns of bubbles while minimizing wear and energy consumption. The blades are made from austenitic steel alloys with a high proportion of chromium (15-20%) for durability and corrosion resistance. Long blades have a higher linear velocity for a given angular velocity. In accordance with Bernoulli's Principle, high fluid speed reduces pressure, and cavitation requires attainment of a sufficiently low pressure. In general, sharper blades create low pressure more easily, enabling bubbles to form at lower rotational speeds and reducing energy consumption (although as explained herein, there may be an optimal bubble size to deter aquatic species of interest). FIG. 3 illustrates a representative cavitation propeller 300 with blades pitched to promote clean detachment of bubbles; this configuration extends blade life, as properly designed blades will sweep the minimum volume necessary to carry bubbles to the water surface. As noted above, the helical column of bubbles 310 created by propeller rotation 300 retains its shape as the column rises.

Figure 4:
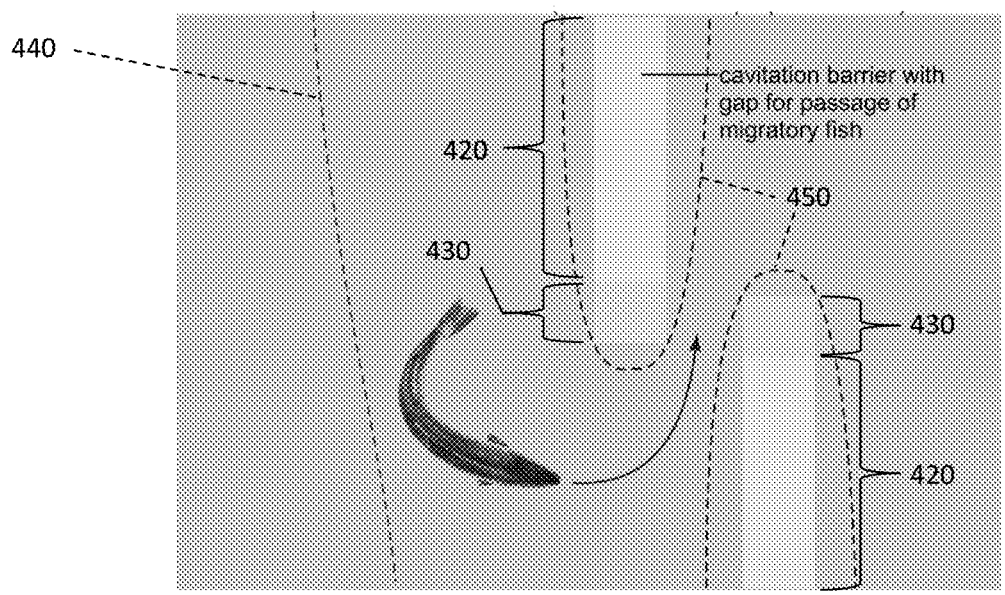
FIG. 4 is a schematic plan view illustrating a partial barrier generated in accordance with embodiments of the invention.

As shown in FIG. 4, a partial barrier 400 (i.e., one not fully spanning the width of the waterway) may be formed to permit other fish to migrate while still making the region inhospitable to target species such as carp. Alternatively, differential sensitivities of fish species to noise can be exploited to create semi-continuous barriers that preferentially exclude some fish but not others. In the regions 420, the barrier strength is relatively strong (i.e., the bubble density is relatively high), whereas in the regions 430, the barrier strength is weaker (i.e., the bubble density is relatively low). Barrier strength can be characterized using optical transmission, sound intensity, and pressure. These properties will vary with depth and water temperature.

For example, as light as light travels from the denser medium (water) to the less-dense medium (water vapor in the cavitation bubble), total internal reflection occurs at a critical angle of 48.6°. This property can be used to measure barrier strength. In particular, a high barrier strength may be defined by transmission of less than 50% of light incident on the barrier at the water/water-vapor critical angle, and a low barrier strength may be defined by transmission of at least 50% of light incident on the barrier at the water/water-vapor critical angle.

In the far field, whose outer range is representatively indicated at 440, the acoustic fields of the regions 420, 430 add constructively to present an effectively continuous barrier. This repels carp. In the near field of the barrier, whose boundary is representatively indicated at 450, fish less deterred by the noise detect the gap indicated by the arrow. The sound and bubble production can be precisely controlled at the location of each propeller 200, 300 by changing the power supplied.

Figure 5:
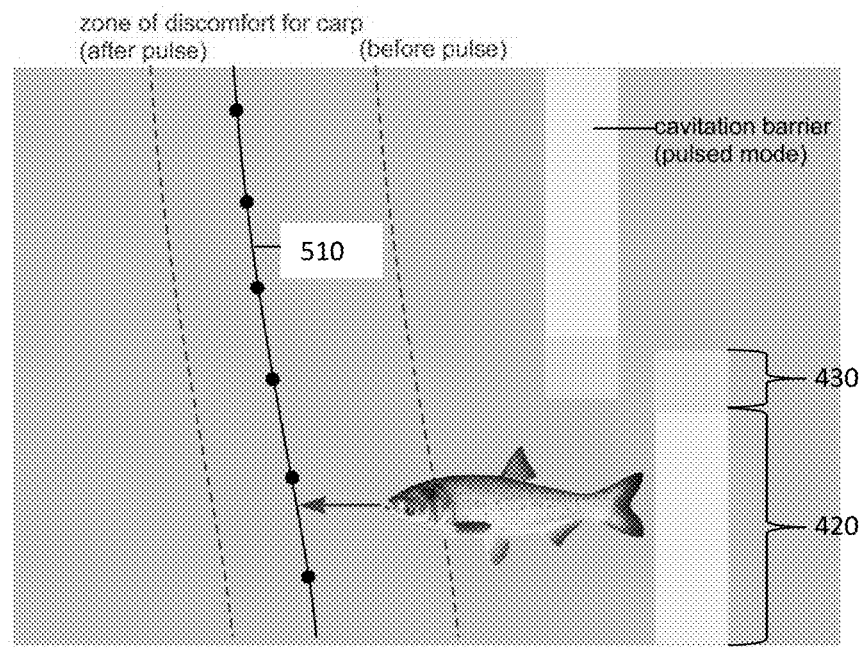
FIG. 5 is a schematic plan view illustrating use of a partial barrier in conjunction with pulsed operation and one or more optional nets.

Another strategy to preferentially target carp, illustrated in FIG. 5, is pulsed operation of the cavitation barrier. Carp are hearing specialist fish and have auditory thresholds of 60 dB at 1 kHz. Propeller cavitation can generate sound levels exceeding 200 dB. Louder noise drives carp into the nets 510, while less sensitive fish are left behind and do not encounter the nets. In particular, desirable fish forage closer to the barrier and remain at a greater distance from the nets 510. Their weaker response to the sound means that "bycatch" will be reduced, and carp removal will be efficient and selective.

Figure 6:
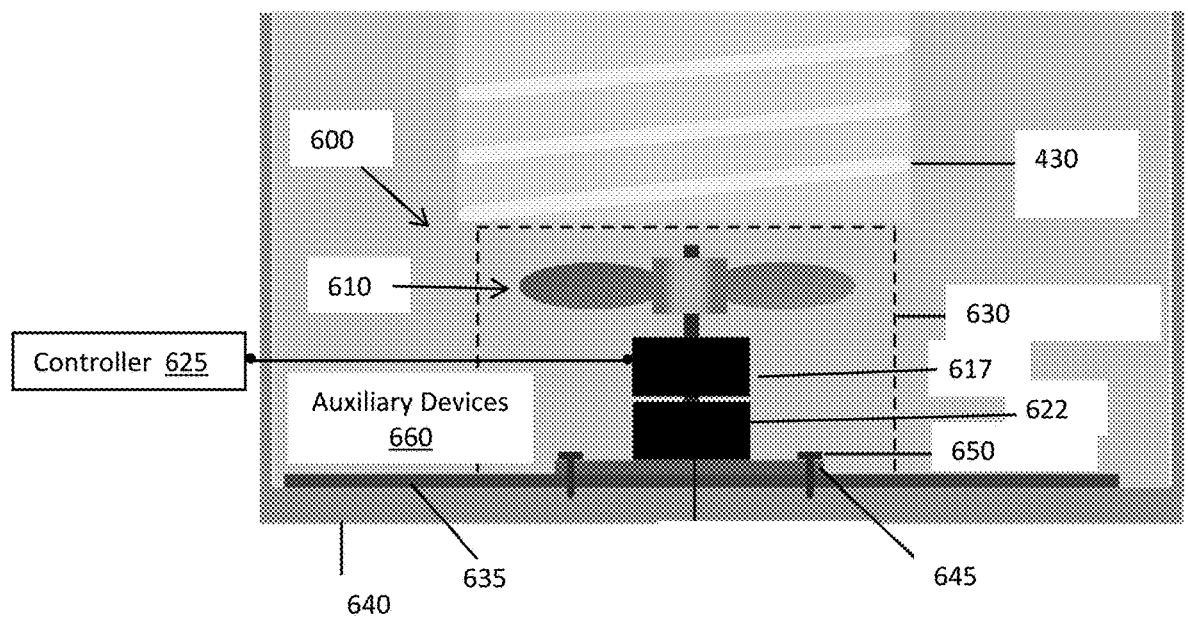
FIG. 6 is a sectional schematic elevation illustrating the components of a representative installation in accordance with embodiments of the invention.

A representative system 600, utilizing a single propeller for illustrative purposes, is shown in FIG. 6. A propeller 610, driven by an electric motor 617, creates a helical column of bubbles. A second electric motor 622 may be included for redundancy, but each motor provides sufficient torque to produce a stable bubble column. The operation and performance of the motor(s) is monitored by a controller 625, which may be connected to the motor(s) by a wired or, in some cases, wireless connection. In some embodiments, the controller 625 is connected (e.g., via the internet or telecommunications infrastructure) to a command server that monitors the operation of one or many fish-barrier installations in accordance herewith. The command server may itself respond to periodic updates from sensors, cameras, and/or human agents who report the presence of undesirable fish in various waterways. Based on this stream of real-time information, the command server issues control signals to various controllers 625 so that the motors operate only where needed and in the appropriate mode. For example, autonomous cameras may operate in conjunction with computer-vision systems and machine-learning classifiers (e.g., convolutional neural networks) that recognize different fish species and send continuous updates to the command server. If the command server receives a report of Asian carp traveling along a monitored waterway, it may signal controllers 625 associated with that waterway and/or tributaries thereto to impede migration of carp to aquatic environments that would be adversely affected. If, however, the command server receives reports of mixed fish populations, it may signal the controllers to operate their associated drive units in pulsed mode or to create semi-continuous barriers so as to preferentially exclude carp or other harmful species. When carp migration ceases, the command server may signal the controllers to shut off their associated drive units. In this way, systems are operated individually, only when needed, and in situationally appropriate modes.

The controller 625 may be provided as either software, hardware, or some combination thereof. For example, the system may be implemented on one or more conventional computers including one or more processors such as the Pentium or Celeron family of processors manufactured by Intel Corporation of Santa Clara, Calif. The processor may also include a main memory unit for storing programs and/or data. The memory may include random access memory (RAM), read only memory (ROM), and/or Flash memory residing on commonly available hardware such as one or more application-specific integrated circuits (ASIC), field-programmable gate arrays (FPGA), electrically erasable programmable read-only memories (EEPROM), programmable read-only memories (PROM), or programmable logic devices (PLD). For embodiments in which the control functions are executed by one or more software programs, the programs may be written in any of a number of high level languages such as PYTHON, FORTRAN, PASCAL, JAVA, C, C++, C #, BASIC, various scripting languages, and/or HTML. The software may be embodied on an article of manufacture including, but not limited to, a hard disk, an optical disk, a magnetic tape, a PROM, an EPROM, EEPROM, field-programmable gate array, or CD-ROM.

The controller 625 may include various additional conventional elements such as one or more mass storage devices, one or more input/output (I/O) ports to receive signals from sensors deployed to monitor motor function, a communication platform including a network interface to facilitate wireless and/or wired communications over a computer network or the telecommunications infrastructure, an input device, and a display. As an alternative or addition to the input device and display, an interface module may be included to permit a user to issue commands and view data via the wireless communication platform using, for example, a smart phone or tablet. In some embodiments, the controller 625 implements a webserver, facilitating remote access and control over the internet via IP and TCP/IP protocols (see, e.g., U.S. Pat. No. 6,201,996, the entire disclosure of which is hereby incorporated by reference). Local communication may take place via WiFi, Bluetooth, ZigBee, IrDa or other suitable protocol. Furthermore, components of the system may communicate through a combination of wired or wireless paths.

Figure 7:
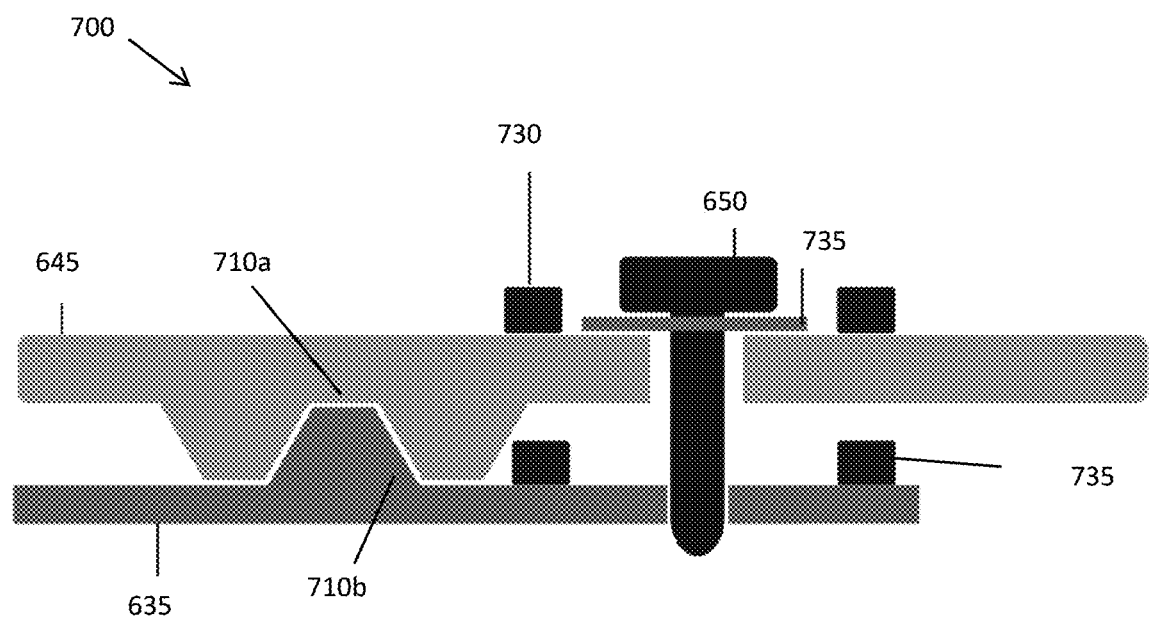
FIG. 7 is a sectional schematic elevation illustrating a suitable mounting system for the installation shown in FIG. 6.

With continued reference to FIG. 6, a protective (typically metal) grid 630 surrounds the motor(s) and the propeller 610, and is anchored, along with the motor(s), to a base plate 635 that is itself affixed to a submerged concrete base 640. The motor(s) may be affixed as a unit to a mounting plate 645 anchored to the base plate 635 by a series of anchors (e.g., four or more) 650. One suitable mounting arrangement 700 is shown in FIG. 7. The mounting plate 645 and the base plate 635 have complementary alignment features 710*a*, 710*b*. The plates 635, 645, once aligned by mating of the features 710*a*, 710, are permanently affixed to the concrete base 640 by the anchors 650, which are driven through aligned apertures 720, 725 in both plates 635, 645 and therebelow into the concrete base. A circular magnet 730 surrounding each aperture 720 of the mounting plate 645 and an additional circular magnet 735 thereunder surrounding the aperture 725 of the base plate 635 allow for convenient placement of a washer 735 and the anchor 650 and enforce vertical alignment of the anchor 650 as it is driven into the concrete base 640.

Deploying propellers as individual modular units permits individual modules to be replaced without interrupting system operation, since most of the barrier will remain active. Depending on the overall number of units, the barrier will still operate as an acoustic deterrent even if a few units are disabled.

Various alternatives or enhancements are possible. For example, cavitation regions may be created using high-pressure jets, piezoelectric transducers, optical sources, or focused ultrasound—collectively indicated at 600 in FIG. 6—instead of or in addition to propellers. Suitable equipment for implementing these alternative approaches to cavitation is conventional or readily obtained or designed by those skilled in the art without undue experimentation.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of selectively deterring migration of a target aquatic species along a waterway having a width, the method comprising the steps of:
providing, arranged transversely across the width of the waterway, a plurality of cavitation-producing drive units each including a propeller; and
operating the drive units to (i) directly induce cavitation in water, the propellers being configured to produce a series of spiral, rotationally confined vertical columns of cavitation vapor bubbles extending from the drive units and collectively forming a curtain spanning the width of the waterway, the curtain repelling the target aquatic species and preventing traversal through the curtain by the target aquatic species, and (ii) create regions in the curtain having weaker cavitation strength to permit traversal through the curtain by a non-target aquatic species while still preventing traversal through the curtain by the target aquatic species.

2. The method of claim 1, wherein the cavitation bubbles manifest as vertical streams.

3. The method of claim 1, further comprising the step of operating the drive units in a pulsed fashion.

4. The method of claim 1, further comprising the steps of:
computationally detecting the target aquatic species upstream from the drive units; and
in response, sending an activation signal to the drive units, the drive units remaining inactive until receipt of the activation signal.

5. The method of claim 1, further comprising, prior to operating the drive units to create regions in the curtain having weaker cavitation strength to permit traversal through the curtain by the non-target aquatic species:
computationally detecting a mixed population of aquatic species upstream from the drive units, the mixed population comprising the target aquatic species and the non-target aquatic species.

6. The method of claim 1, wherein each drive unit comprises a motor and a propeller.

7. The method of claim 1, wherein each drive unit comprises a high-pressure jet.

8. The method of claim 1, wherein each drive unit comprises a piezoelectric transducer.

9. The method of claim 1, wherein each drive unit comprises an optical source.

* * * * *